Nov. 12, 1963
R. T. BECKER ETAL
3,110,453
CABLE RELEASE
Filed Jan. 2, 1962
2 Sheets-Sheet 1
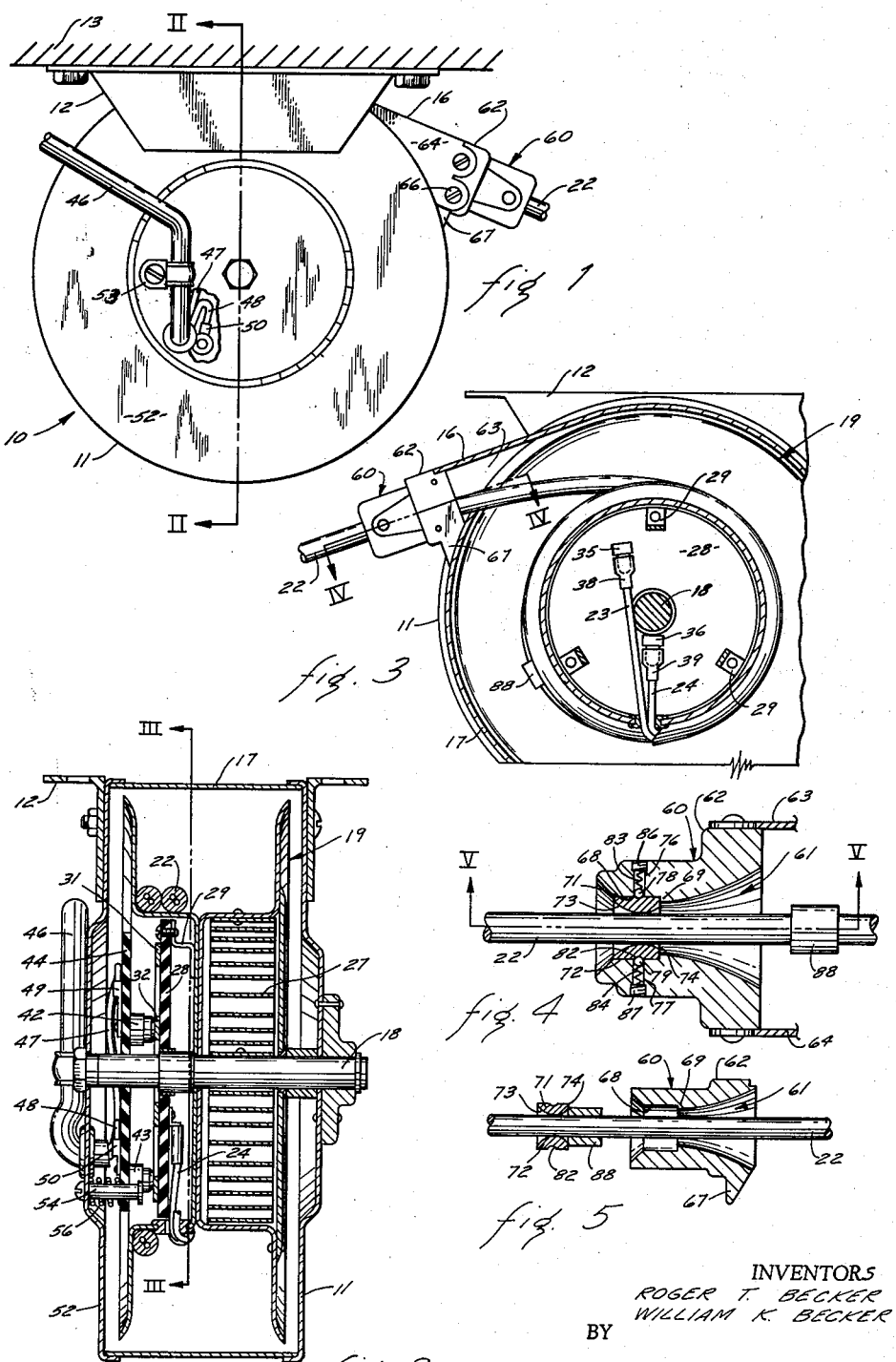
INVENTORS
ROGER T. BECKER
WILLIAM K. BECKER
BY
Woodhams Blanchard & Flynn
ATTORNEYS Nov. 12, 1963　　　R. T. BECKER ETAL　　　3,110,453
CABLE RELEASE
Filed Jan. 2, 1962　　　　　　　　　　　　　　2 Sheets-Sheet 2
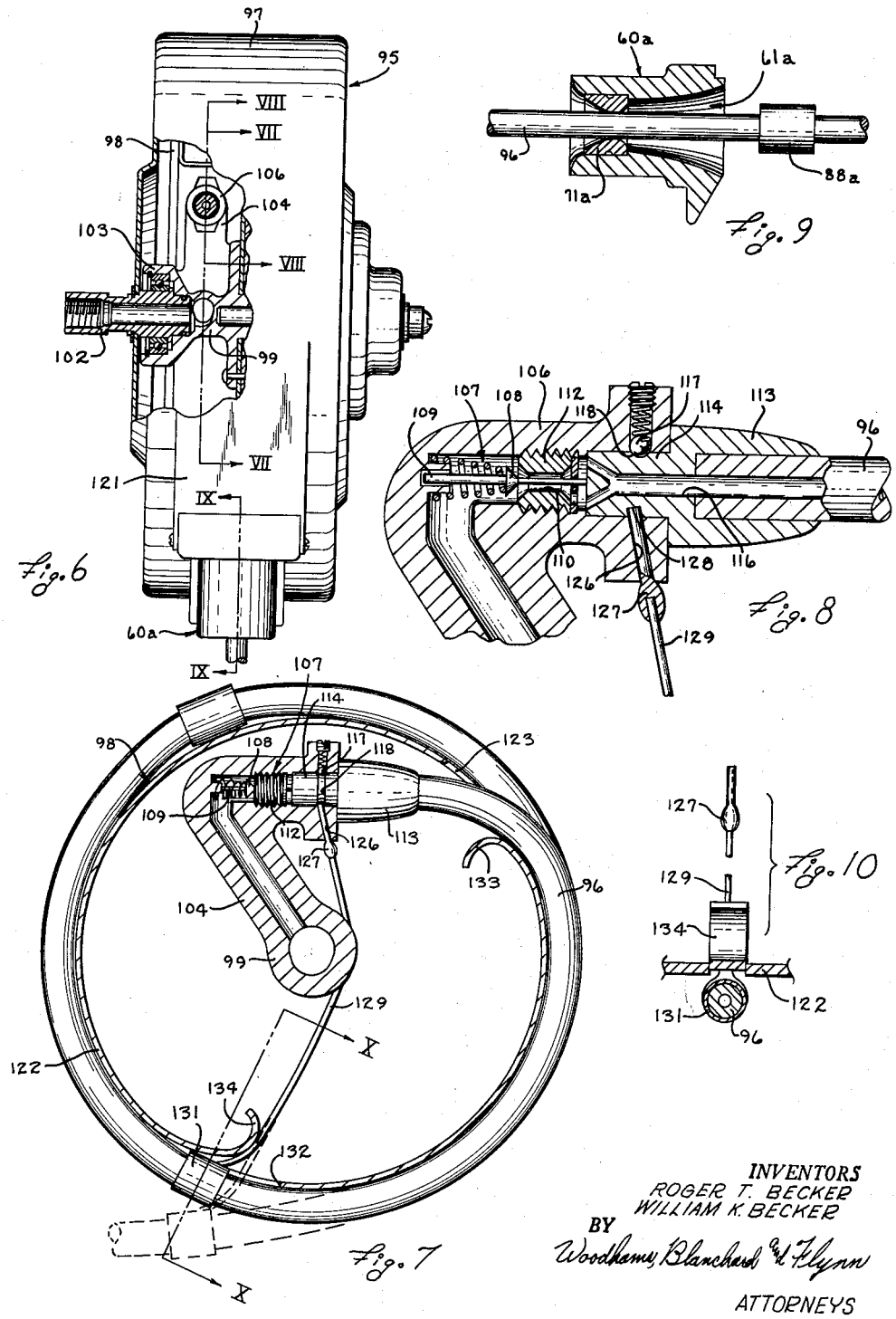
INVENTORS
ROGER T. BECKER
WILLIAM K. BECKER
BY
Woodhams, Blanchard & Flynn
ATTORNEYS

United States Patent Office 3,110,453
Patented Nov. 12, 1963

3,110,453
CABLE RELEASE
Roger T. Becker, Kalamazoo, and William K. Becker, Ross Township, Kalamazoo County, Mich., assignors to Aero-Motive Manufacturing Company, Kalamazoo, Mich., a corporation of Michigan
Filed Jan. 2, 1962, Ser. No. 169,699
13 Claims. (Cl. 242—107.2)

This invention relates in general to a mechanism for obstructing the lengthwise movement of an elongated element with respect to means guiding said element until a predetermined force is applied to said element and, more particularly, to a device of this type which permits the disconnection of a cable or conduit from a reel structure supporting said conduit before an excessive force applied to said conduit away from said reel structure can inflict damage upon the reel and/or the conduit.

The particular problem which gave rise to this invention developed in the field of cord reels. Accordingly, the following disclosure will, for convenience of illustration and where specific details are advantageous, be in terms of a cord reel structure, particularly of the type designed to support an elongated element, such as an electrical conductor or a conduit for fluids. However, it will be recognized that the invention will apply with equal effectiveness to the control of the movements of elongated elements in general, even though they are not mounted upon or associated with a reel assembly.

There are numerous instances wherein a conventional cord reel assembly is mounted upon a substantially fixed structure for connection to an article, such as a tool or an extension lamp, which is used in connection with mechanisms which are moved into, and later removed from, a position adjacent the mounted reel assembly. For example, trucking firms, freight yards and garages often have an electric cord reel mounted near a loading dock or a repair facility and connected to a lamp for use in working with or upon vehicles. It is customary for the workman to hang the inspection lamp upon the vehicle while he is using the lamp in connection with such vehicle. It is not uncommon for the workman to forget to remove the lamp from the vehicle when he leaves same. Thus, the operator of the vehicle may move the vehicle away from the location of the cord reel assembly while the inspection lamp is still connected to the vehicle.

An effort has been made to overcome this problem by providing the lamp with a disconnectable hanger, as shown in Patent No. 2,716,701. However, the cord or conduit sometimes becomes tangled with or caught upon the vehicle so that the disconnectability of the hanger from the lamp does not solve the problem. That is, the release, to be effective, must occur at a point in the cord near the end thereof which is secured to the cord reel.

In existing cord reel constructions, the electrical conductor for example, is connected to the cord reel structure so that some part of the reel structure is often damaged seriously when the cord is pulled beyond its length from the cord reel. In fact, the entire reel assembly is sometimes ripped from its mounting or the electrical conductor is snapped in two, thereby creating the further problem of a fire hazard, as well as a piece of equipment which may be electrified.

In pondering this problem, we conceived the idea of mounting the electrical conductor so that it is separated from the remainder of the cord reel assembly when a predetermined force is applied to the conductor in a direction away from the cord reel, such force being materially less than that required to rip the assembly from its mounting or snap the electrical conductor, or otherwise injure the cord reel assembly, or endanger people in the vicinity thereof. With this provision, the cord and the item secured to the outer end thereof might be lost. However, the remainder of the assembly, which usually constitutes the biggest share of the cost, would be undamaged and ready for immediate use as soon as the cord and the inspection light are replaced.

Accordingly, a primary object of this invention has been the provision of a mechanism whereby the lengthwise movement of an elongated element can be obstructed in a selected direction until the force applied to effect such movement exceeds a predetermined amount which is less than the force required to damage the element or any article secured thereto.

A further object of this invention has been the provision of a release mechanism, as aforesaid, which can be adapted to protect a cord reel assembly in which the elongated element is an electrical conductor supported upon the reel assembly.

A further object of this invention has been the provision of a release mechanism, as aforesaid, which is easy to install, very inexpensive to provide, completely foolproof in operation, and which does not require any material or bulky changes in the structure of existing cord reels with which the mechanism is used.

A further object of this invention has been the provision of a release mechanism, as aforesaid, which positively protects a cord reel assembly from damage and the cord thereof from rupture when an unrestrained force is applied to the cord in a direction away from the reel assembly, which mechanism is arranged or constructed so that it can be reset and reused, along with the cord which it serves, after a release operation has been performed therewith.

Other objects and purposes of this invention will become apparent to persons familiar with this type of equipment upon reading the following descriptive material and examinating the accompanying drawings in which:

FIGURE 1 is a side elevational view of a reel assembly embodying the invention.

FIGURE 2 is a sectional view taken along the line II—II in FIGURE 1.

FIGURE 3 is a fragmentary, sectional view taken along the line III—III in FIGURE 2.

FIGURE 4 is a sectional view taken along the line IV—IV in FIGURE 3.

FIGURE 5 is a sectional view taken along the line V—V in FIGURE 4 with parts thereof in different positions of operation.

FIGURE 6 is a broken, top view of a reel construction embodying the invention as applied to a hose reel.

FIGURE 7 is a sectional view substantially as taken along the line VII—VII in FIGURE 6.

FIGURE 8 is a sectional view taken along the line VIII—VIII in FIGURE 6.

FIGURE 9 is a sectional view taken along the line IX—IX in FIGURE 6.

FIGURE 10 is a sectional view taken along the line X—X in FIGURE 7.

For convenience in description, the terms "upper," "lower" and words of similar import will have reference to the reel assembly and parts thereof as appearing in FIGURE 1. The terms "inner," "outer" and derivatives thereof will have reference to the geometric center of the said reel assembly and parts thereof.

General Description

The objects and purposes of the invention, including those set forth above, have been met by providing a mechanism for releasably securing a conduit or cord with respect to a cord reel assembly having a reel housing and a cord supporting drum rotatably mounted within said housing.

The drum is spring biased for rotation in a rewind direction and the cord may be an electrical conductor, which is secured at one end to the drum and extends through a guide member mounted upon the housing. A release member is secured to the cord near the end thereof secured to the drum and a stop element is releasably secured to the guide member so that said stop element is dislodged by the release member on the cord when said release member is urged against the stop element by a relatively high, predetermined amount of force. The stop element is mounted in the guide member so that its release will be effected by a force which may be adjustable, and which is less than the force required to rupture the cord or otherwise damage the reel assembly. The cord is connected to the drum so that it can be disconnected by applying to the cord a force which is substantially less than that required to dislodge the stop element from the guide member.

Detailed Description

The reel assembly 10 (FIGURE 1), which has been selected to illustrate a preferred embodiment of the invention, includes a housing 11 having an integral bracket 12 for mounting the assembly upon a structure such as the wall 13. The housing 11 has a tangentially disposed, cord outlet 16 mounted upon the peripheral wall 17 of the housing 11. A shaft 18 extends concentrically through, and is mounted upon, the housing 11 for rotatable support of the drum 19, which supports the cord 22. In this particular embodiment, the cord 22 (FIGURE 3) is an electrical cable containing two insulated conductors 23 and 24. However, the invention remains the same whether there is one or several conductors in said cable.

The drum 19 (FIGURE 2) is connected to one end of a spiral spring 27, the other end of which is connected to the shaft 18. The spring 27 is mounted so that it resiliently resists rotation of the drum 19 in a counterclockwise direction, as appearing in FIGURE 3, and thereby resists unwinding of the cable 22 from said drum. An insulating disk 28 (FIGURE 2) is mounted upon that side of the drum 19 opposite from the spring 27 by brackets 29 so that it is substantially perpendicular to and concentrically encircles the shaft 18. Two concentric, spaced commutator rings 31 and 32 are supported upon the outer side of the disk 28. Two connector fingers 35 and 36 (FIGURE 3) are mounted upon the inner side of the insulating disk 28 and electrically connected to the commutator rings 31 and 32, respectively. Coupling sleeves 38 and 39 are mounted upon the ends of the electrical conductors 23 and 24, respectively, for snug but slidable engagement with the connector fingers 35 and 36 to effect an electrical connection between the commutator rings 31 and 32 and said electrical conductors 23 and 24, respectively.

Brushes 43 and 42 (FIGURE 2), which are slidably engageable with the commutator rings 31 and 32, respectively, are mounted upon an insulating disk 44, which encircles and is concentric with the shaft 18. An input cable 46 has two electrical conductors 47 and which are electrically connected respectively to the brushes 42 and 43 by the connectors 49 and 50. The input cable 46 is secured to the side wall 52 of the housing 11 by a clamp 53. The disk 44 is movably supported upon the side wall 52 by a plurality of pins 54 which slidably extend through appropriate openings in the disk 44. Spiral springs 56 encircle the pins 54 and urge the disk 44 toward the drum 19 whereby the brushes 42 and 43 are continuously and resiliently urged against the commutator rings 31 and 32.

The above-described structure, with the possible exception of the connector fingers 35 and 36 and the coupling sleeves 38 and 39 may be substantially similar to existing structures for the same or similar purposes. However, a device like the clamp 53 is usually provided to secure the cable 22 near its inner end of the drum 19.

A guide fixture 60 (FIGURES 3, 4 and 5) is mounted upon the peripheral wall 17 of the housing 11 and the adjacent portion of the cord outlet 16 so that the central opening 61 through the fixture 60 is aligned with the opening through the cord outlet 16 and is substantially tangential to the drum 19. The guide fixture 60 (FIGURE 4) has a sidewardly projecting flange 62 at its inner end which is received between and secured to the sidewalls 63 and 64 of the cord outlet 16 (FIGURE 4) by means such as the screws 66. The flange 62 has a downwardly and frontwardly sloping bottom portion 67 which engages the peripheral wall 17 and thereby properly positions the fixture 60 upon the housing 11.

The opening 61 (FIGURES 4 and 5) through the fixture 60 has a circular cross-section and it diverges in both axial directions away from the central portion of the opening, thereby minimizing the obstruction of said defining walls to the free movement of the cable 22 through said opening 61. The central portion of the wall defining the opening 61 has a cylindrical surface 68 which is terminated at its inner end by the annular shoulder 69.

An annular stop element 71 (FIGURE 4), having a cylindrical peripheral surface 72, is slidably receivable into, and snugly engageable by the cylindrical surface 68 of the opening 61, said element 71 preferably being of approximately the same axial length as the cylindrical surface 68. Said annular stop element 71 has a coaxial, central opening 73 through which the cable 22 is slidably receivable with a minimum of looseness. The central opening 73 through the stop element 71 diverges in both axial directions away from the central portion of the opening in order to minimize obstruction to the free movement of the cable 22 through the stop element. The inner end 74 (FIGURE 4) of the stop element 71 projects radially inwardly substantially beyond the radially inner edge of the shoulder 69, adjacent the cylindrical surface 68, so that said inner end 74 of the stop element 71 is materially smaller in diameter than the minimum diameter of the opening 61.

The guide fixture 60 has a pair of coaxial, radially disposed detent openings 76 and 77 having portions of slightly reduced diameter at the inner ends thereof. Detent balls 78 and 79 are disposed within the detent openings 76 and 77, respectively, at the inner ends thereof for reception into an annular groove 82 in and around the peripheral surface 72 of the stop element 71. A pair of spiral springs 83 and 84 are disposed within the detent openings 76 and 77 and are held under compression against the detent balls 78 and 79 by the retaining screws 86 and 87. By appropriate adjustment of the retaining screws 86 and 87, the pressure urging the detent balls 78 and 79 into the groove 82 can be carefully adjusted so that a predeterminable amount of force is required to unseat the stop element 71 from within the confines of the cylindrical surface 68 in a direction away from the shoulder 69. The resistance to such unseating can be increased or decreased by moving said retaining screws 86 and 87 toward or away from each other, respectively.

The cable 22 (FIGURES 4 and 5) is received through and snugly engaged by an annular release member 88, which is preferably positioned upon said cable near the end thereof supporting the coupling sleeves 38 and 39. The release member 88 is secured upon the cable 22 in any convenient manner, so that it will engage and dislodge the stop element 71 from within the cylindrical surface 68 without moving any substantial distance along said cable 22 and, moreover, before the cable 22 is ruptured by such dislodgment. The outside diameter of the releaase member 88 is such that it can pass through the narrowest part of the opening 61 without any obstruction therefrom but cannot pass through the stop element 71. The stop element can be reset into its position within the cylindrical surface 68 by manually urging same toward the shoulder 69.

In one particular embodiment, where an extension light cable was involved, a force of approximately 40 pounds had to be applied to the cable in a direction away from the housing 11, to cause the release member 88 to dislodge the stop element 71 from within the cylindrical surface 68.

No specific reference has been made herein to a lock mechanism for holding the drum 19 in a selected position after a portion of the cable 22 has been unwound therefrom. However, such structure is contemplated by this invention. For example, the lock mechanisms shown in Patent No. 2,698,146 or in Patent No. 2,969,932 would be well suited for this purpose.

*Operation*

The reel assembly 10 is normally mounted so that the housing 11 thereof is secured upon a wall, such as the ceiling 13 in a building (FIGURE 1). The input cable 46 may be connected in a conventional manner to a source of electrical energy. The output cable 22 may be connected at its outer end to a device operated by electrical energy, such as an electric lamp or electrically operated tool. The annular release member 88 is preferably located on the cable 22 so that it will strike the annular stop element 71 just before said cable has become completely unwound from the drum 19. This arrangement insures safe, continuous electrical connection between the coupling sleeves 38 and 39 and the connector fingers 35 and 36, respectively, with the cable substantially fully unwound. If, at this point, an excessive force is applied to the outer portion of the cable 22 in a direction away from the reel housing 11, the stop element 71 is dislodged from within the fixture 60 by the release member 88 and the conductors 23 and 24 are thereafter disengaged from the connector fingers 35 and 36. Thus, cable 22 can move off of the drum 19 and away from the housing 11 without damage of any kind to the cable 22 or the remainder of the reel assembly 10, as the result of such disconnection.

The reel assembly 10 can be returned to its operating condition by opening the housing 11 in a conventional manner and threading the cable 22 through the fixture 60 so that the conductors 23 and 24 can be connected to the connector fingers 35 and 36, respectively. The cable 22 is wound upon the drum 19 and the spring 27 is provided with the proper tensioning, after which the housing 11 is closed. The annular stop element 71 is forceably urged back into the cylindrical portion 68 of the guide opening 61 in the fixture 60. Thus, the reel assembly containing a cable release mechanism of the invention can be easily returned to satisfactory operating condition after the release mechanism has performed its function of permitting the cable to become disconnected from the remainder of the reel assembly without damage thereto.

As stated previously, the cord reel assembly 10 has been selected for convenience to illustrate one preferred embodiment of the invention and one way in which the invention can serve a very useful purpose. The following description relates to a related use for the invention.

*Alternate Structure*

The reel assembly 95 (FIGURE 6) is designed to control an air hose 96 and it includes an embodiment of the invention adapted for use with an air hose. More specifically, the reel assembly 95 includes a housing 97 in which a drum 98 is rotatably mounted for supporting said hose 96. The drum 98 includes a hollow shaft 99 which is rotatably connected by a sealed coupling 103 to an inlet pipe 102, which may embody a substantially conventional structure. The shaft 99 may include an integral outlet pipe 104 (FIGURE 7) having an outer portion 106 disposed along a chord line of the drum. A check valve 107 (FIGURE 8), which is disposed within the outer portion 106 of the pipe 104, includes a spring biased valve 108 having a valve stem 109 extending through the opening 110 in the valve seat 112.

A coupling 113, which is secured to the inner end of the hose 96, has an insertion end 114 of reduced diameter, which is slidably inserted into the open end of the pipe portion 106 so that it engages the valve stem 109 and thereby opens the check valve assembly 107. The coupling 113 has an opening 116 therethrough communicating between the hose 96 and the opening 110 through the valve seat 112. A spring biased detent 117 is disposed in the outer end of the pipe portion 106 for reception into an annular groove 118 encircling the insertion end 114 of the coupling 113 for releasably holding the coupling 113 in engagement with the outlet pipe 104 and thereby holding the valve 108 in the open position.

The peripheral wall 122 (FIGURE 7) of the drum 98 has an opening 123 through which the air hose 96 and the coupling 113 thereon can be freely moved for the purpose of connecting or disconnecting the coupling with respect to the outlet pipe 104. The force by which the detent 117 holds the coupling 113 in connection with the outlet pipe 104 will not normally be sufficient to prevent the air pressure within the shaft 99 from blowing the coupling 113 out of the outlet pipe 104 when the valve 108 is opened by the insertion of said coupling 113 into the pipe 104. Thus, an additional retaining device is required to hold the insertion end 114 within the pipe portion 106.

In one, but by no means the only, form of holding device (FIGURE 8), the outer end of the pipe portion 106 is provided with a radially disposed opening 126 which may be diametrically opposite the detent 117. A lock pin 127 is slidably and snugly received into the opening 126 so that its inner end extends into a recess 128 in the circumferential surface of the insertion end 114 on the coupling 113. A cable 129 is connected at one end to the outer end of the lock pin 127 and at its other end to the air hose 96 by the clamping ring 131. That is, the cable 129 extends through an opening 132 in the peripheral wall 122 of the drum 98, which opening is spaced circumferentially from the opening 123.

The openings 123 and 132 are provided with arcuate guides 133 and 134, respectively, which are integral with the peripheral wall 122 of the drum and tend to lead the coupling 113 and lock pin 137 through said openings 123 and 132, respectively. The opening 132 is located with respect to the opening 123 so that the cable 129 will be moved sufficiently by the hose 96, as it unwinds, to disconnect the lock pin 127 from both the pipe portion 106 and the coupling 113 before, but preferably just before, the hose 96 is completely unwound from the drum 19. Thus, the coupling 113 will be held by the pin 127 against removal from the pipe portion 106 until just before an excessive force might otherwise be applied to the hose 96 and thereby effect such removal with damaging results.

A guide fixture 60a (FIGURES 6 and 9), which may be substantially identical with the guide fixture 60, is mounted in the outlet 121 on the housing 97 for the purpose of guiding the air hose 96, as it is unwound from or wound upon the drum 98. The guide fixture 60a has a central opening 61a in which an annular stop element 71a is relesably held in a manner which may be the same as discussed above with respect to the corresponding structure in the guide fixture 60 (FIGURE 5).

An annular release member 88a encircles and snugly embraces the air hose 96 at a point thereon near to, but spaced outwardly from the clamping ring 131. The release member 88a is spaced from said ring 131 a sufficient distance that it will strike and dislodge the stop element 71a from within the fixture 60a before the hose 96 is unwound from the drum 98 at the point where the clamping ring is located. Thus, the coupling 113 is not released until the stop element 71a is dislodged from the fixture 60a. Outward movement of the air hose 96 will normally be terminated by engagement between the stop element 71a and the release member 88a. When the force applied at this point becomes excessive, so that the hose 96 might be ruptured, the stop element 71a is dislodged from the guide fixture 60a and the entire hose, including the coupling 113, will be pulled away from the drum 98 without damage to either the air hose 96 or the remainder of the reel assembly 95. The valve 108 will automatically close and there will be no escape of pressure fluid from the reel assembly 95.

Although particular preferred embodiments of the invention have been disclosed in detail above for illustrative purposes, it will be understood that variations or modifications of such disclosure, which come within the scope of the appended claims, are fully contemplated.

What is claimed is:

1. A mechanism for releasably connecting an elongated electrical conductor to a reel assembly having a drum for supporting said conductor and structure rotatably supporting said drum, comprising:

guide means on said structure for guiding movement of said conductor as it is wound upon and unwound from said drum;
    connector means on said drum releasably engageable with one end of said conductor;
    a release member secured to the portion of said conductor disposed between said guide means and said connector means;
    a stop element mounted on said guide means and engageable by said release member for arresting movement of said conductor through said guide means, said stop element being movable with respect to said guide means when the force effecting engagement of said stop element by said release member exceeds a selected amount, whereby said conductor can move completely through said guide means and the conductor is disconnected from the connector means.

2. A mechanism according to claim 1, including
    slip ring means mounted for rotation with said drum and electrically connected to said connector means;
    brush means mounted on said structure and slidably engaging said slip ring means;
    electrical input conductor means electrically connected to said brush means;
    said first mentioned conductor including a plurality of insulated wires; and
    said connector means including a plurality of connector fingers mounted on said drum with each finger being connected to a separate slip ring, and a coupling sleeve connected to each of said wires, each sleeve snugly and slidably receiving one of said fingers.

3. A mechanism for releasably connecting an elongated element to a reel assembly having a drum for supporting said element and structure rotatably supporting said drum, comprising:

guide means on said structure for guiding movement of said element as it is wound upon and unwound from said drum;
    connector means on said drum releasably engageable with one end of said element;
    a release member secured to the portion of said element disposed between said guide means and said connector means;
    a stop member mounted on said guide means and engageable by said release member for arresting movement of said element through said guide means, said stop member being movable with respect to said guide means when the force effecting engagement of said stop member by said release member exceeds a selected amount, whereby said element can move completely through said guide means and the element is disconnected from the connector means.

4. A mechanism according to claim 3, in which said guide means is an annular member having therethrough an axially elongated opening of circular cross-section diverging in both axial directions away from the central portion of said elongated opening;

said elongated opening having a cylindrical surface terminating in an annular shoulder at the end thereof closest to said drum; and
    said stop member having a cylindrical peripheral surface slidably received into and snugly engaging said cylindrical surface of said opening, said stop member further having a coaxial central opening through which said elongated element slidably extends, the diameter of said opening in said stop member adjacent said shoulder being materially smaller than the minimum diameter of said central opening in said guide means.

5. A mechanism according to claim 3, said elongated element being a hose;

said connector means including a pipe having a substantially radial opening therein, and a coupling on the end of said hose, said coupling having an end slidably and snugly received within said pipe, said end of said coupling having a recess communicating with the radial opening in said pipe;
    a lock pin extending through said radial opening in said pipe and into the recess in said end of said coupling; and
    means connected to said pin and to said hose for removing said pin from said recess in said end of said coupling before said hose is completely unwound from said drum.

6. A device for releasably securing an electrical conductor near one end thereof to a reel assembly having a spring biased drum upon which the conductor can be wound and housing means rotatably supporting said drum, comprising:

a guide member mounted upon said housing means and having a guide opening through which said conductor is slidably movable;
    connector means on said drum releasably and electrically connected to one end of said conductor;
    a release member affixed to and extending radially from the portion of said conductor located between one end thereof and said guide member;
    a stop element removably mounted upon said guide member adjacent the opening therein and engageable by said release member for preventing movement of said release member through said opening, whereby movement of said conductor is obstructed; and
    holding means supported upon said guide member for yieldably resisting removal of said stop element from said guide member, said stop being removed from said guide member by said release member in response to a predetermined force applied to said stop element by said release member when they are engaged and said force is directed away from the reel assembly, whereby said release member and said one end of said conductor can be pulled through said guide member and said conductor is disconnected from said connector means.

7. The structure of claim 6 wherein said release member is a collar firmly secured to said conductor near said one end thereof; and
    wherein said stop element is a sleeve releasably held by said holding means snugly within said guide member and concentric with the opening therethrough.

8. The structure of claim 6 wherein the force required to disengage said stop element from said holding means and from within said guide member is exerted by pulling on the part of said conductor extending through said guide member and disposed outside of said housing when said release member is adjacent said stop element; and wherein said force is substantially greater than the force required to disengage said one end of said conductor from said connector means.

9. A mechanism for releasably securing a pressure fluid conduit near one end thereof to a reel assembly having a spring biased drum upon which the conduit is wound and housing means rotatably supporting said drum, comprising:
   a guide member mounted upon said housing means and having a guide opening through which said conduit is slidably movable;
   a pressure fluid inlet means supported upon said drum;
   coupling means releasably connecting said pressure fluid inlet means to one end of said conduit for effecting communication therebetween;
   a check valve in said pressure fluid inlet means, said valve being open when said conduit is coupled with said pressure fluid inlet means;
   a release member affixed to and extending radially from said conduit between said one end thereof and said guide member;
   a stop element removably mounted within said guide member adjacent the opening therethrough and engageable by said release member for preventing movement of said release member through said opening; and
   holding means supported upon said guide member for yieldably resisting removal of said stop element from said guide member, said stop being removed from said guide member by said release member in response to a predetermined force applied to said stop element by said release member when they are engaged and said force is directed away from the reel assembly, whereby said release member and said one end of said conduit can be pulled through said guide member and said conduit is disconnected from said connector means, thereby closing said check valve.

10. A mechanism according to claim 9, in which said check valve has a valve seat and a valve element sealingly engageable with said valve seat, spring means urging said valve element toward said valve seat, and means on said coupling means for engaging said valve element and moving it away from said valve seat when said coupling means is connected to said pressure fluid inlet means;
   said coupling means having an end of reduced diameter which is snugly and slidably received within an opening in said pressure fluid inlet means, said inlet means having a radial opening and said end of said coupling means having a recess communicating with said radial opening;
   a lock pin extending through the radial opening in said pressure fluid inlet means and into said recess in said end of said coupling;
   a cable connected at one end thereof to said pin and connected at the other end thereof to said pressure fluid conduit at a point thereon spaced from said end; and
   means on said drum engageable by said cable as said pressure fluid conduit is unwound for causing said cable to remove said pin from said recess in said end of said coupling before said pressure fluid conduit is completely unwound from said drum.

11. A device for limiting movement of an elongated element in a lengthwise direction with respect to a reel assembly having drum means for supporting said element, comprising:
   a guide member supported upon the reel assembly and having an opening therethrough for slidably receiving and guiding said elongated element;
   a release member fixedly secured to said elongated element and extending radially therefrom;
   an annular stop member removably mounted upon the guide member and in said opening, said elongated element slidably extending through said stop member so that said release member can engage said stop member and thereby arrest lengthwise movement of said elongated element with respect to said guide member and through said stop member in one direction lengthwise thereof and away from the drum means; and
   means releasably attaching said stop member to said guide member, said stop member being removed from said guide member by said release member when a predetermined force is applied to said stop member by said release member in response to movement of said element in said one direction.

12. A mechanism for releasably holding an elongated element with respect to a reel assembly having a drum for supporting said element and structure rotatably supporting said drum, comprising:
   guide means on said structure for guiding movement of said element as it is wound upon and unwound from said drum;
   connector means on said drum;
   coupling means on said element releasably and operably connecting one end of said element to said connector means;
   a release member secured to and extending radially from said element near said connector means, said release member being disposed between said guide means and said coupling means;
   an annular stop member removably mounted upon said guide means and encircling said element, said stop member being engaged by said release member for arresting lengthwise movement of said element with respect to said guide means and away from said drum, said stop member being detached from said guide means by said release member when a selected force is applied to said stop member by said release member in response to said movement of said element away from said drum, whereby said element can move freely with respect to said guide means away from said drum, and the coupling means on said element is disconnected from the connector means.

13. The structure of claim 12 wherein said elongated element is a hose; and
   including a check valve in said connector means on said drum, said valve being open when said coupling means is operably connecting on end of said hose to said connector means, said check valve being closed in response to disconnection of the said coupling means from said connector means.

References Cited in the file of this patent

UNITED STATES PATENTS

| | | |
|---|---|---|
| 559,022 | Barnes | Apr. 28, 1896 |
| 2,434,864 | Powell | Jan. 20, 1948 |
| 2,446,647 | Frankwich | Aug. 10, 1948 |
| 3,031,168 | Rambaldi | Apr. 24, 1962 |